United States Patent [19]

Mehnert et al.

[11] 3,892,513
[45] July 1, 1975

[54] APPARATUS FOR MAKING BLOW-MOLDED CONTAINERS HAVING HANDLES

[75] Inventors: Gottfried Mehnert, Berlin; Klaus-Dieter Koetke, Luder, Orfsteil, Reinstorf, both of Germany

[73] Assignee: Bekum Maschinenfabriken GmbH, Berlin, Germany

[22] Filed: Dec. 22, 1972

[21] Appl. No.: 317,651

[30] Foreign Application Priority Data
Dec. 24, 1971 Germany.......................... 7148683

[52] U.S. Cl...... 425/302 B; 425/806; 425/DIG. 214
[51] Int. Cl. ................................................ B29c 1/00
[58] Field of Search.. 425/DIG. 214, 806, DIG. 208, 425/387 B, 302 B

[56] References Cited
UNITED STATES PATENTS

| | | | |
|---|---|---|---|
| 3,120,679 | 2/1964 | Price et al................. | 425/DIG. 214 |
| 3,233,416 | 2/1966 | Rainwater et al.......... | 425/DIG. 208 |
| 3,538,543 | 11/1970 | Nataf...................... | 425/DIG. 214 |
| 3,695,109 | 10/1972 | Uhlig...................... | 425/806 |
| R23,564 | 10/1952 | Hobson.................... | 425/DIG. 214 |

Primary Examiner—Francis S. Husar
Assistant Examiner—Robert J. Charvat
Attorney, Agent, or Firm—Michael S. Striker

[57] ABSTRACT

Two mold sections are provided for making the body of a blow-molded synthetic plastic container. One of the mold sections has a rigid first surface whose outline corresponds to that of a generally annular handle to be formed and it has an opening corresponding to the center opening of the handle to be formed. The other mold section has a component mounted for guided movement toward and away from the surface and is itself provided with a second surface cooperating with first-mentioned one for forming the handle therewith and for forming a web-shaped severed flashing where the center opening of the handle is to be. Another component is provided on the first-mentioned mold section and has a third surface corresponding to the opening in the first-mentioned surface and being movable relative to the same and to the surface on the other mold section for withdrawing the severed flashing from the handle.

10 Claims, 5 Drawing Figures

APPARATUS FOR MAKING BLOW-MOLDED CONTAINERS HAVING HANDLES

BACKGROUND OF THE INVENTION

The present invention relates to the making of containers in general, and more particularly to the making of blow-molded containers. Still more particularly the invention relates to an apparatus for the making of blow-molded containers having handles.

The blow-molding of containers from synthetic plastic material is already well known. It is also known to make such containers with handles. Frequently this is done in that a tubular parison, or a parison which may be of parallel foil strips, is ejected from the head of an extruder in warm and plastic condition. It is then inserted between the two spaced-apart sections of a blow mold whereupon compressed air is introduced into it after the blow mold has been closed, and the parison is expanded by this air to the desired configuration. Another approach, which may be combined with the one just mentioned, is to withdraw air from the interior of the mold around the parison, that is to create a suction condition.

Irrespective of which approach is used, the parison is closed off only after the mold sections have been moved to mold-closing position and, if blow-molding is effected by introducing compressed air into the parison, after a blowing mandrel has been introduced. Because of this, the ends of the parison are squeezed by edges of the mold sections and/or the mandrel, forming so-called flashings. These flashings are unsightly and must be removed from the finished article. In order to avoid having to carry out a later expensive removal step, it is known in the art to resort to various possibilities for removing the flashings without a separate step. It is for instance known to remove the flashing by engaging the just-molded article by the flashing, withdrawing it from the mold which has been opened and permitting it to cool, whereupon it is placed upon an abutment corresponding in its configuration to that of the flashing. Pressure is now exerted on the flashing, pressing the same against the abutment until the flashing has been severed.

However, there are other conditions under which flashing is also created. For instance, the production of a blow-molded container or the like having a generally annular handle, also results in the formation of flashing. This occurs if the handle is formed by the mold sections in that it has a part-circular configuration and is at its opposite ends of one piece with the container itself. How this is done is very well known in the art and it is known that usually a flashing exists at the outer side of the handle, and another flashing at the inner side of the handle, that is in the opening which is to be surrounded by the handle and in which the fingers or hand of user are subsequently to be inserted when the container is to be carried by the handle. The removal of flashing at the outer side of the handle can be carried out in accordance with known approaches, for instance the one outlined above. However, the removal of flashing within the handle, that is within the area surrounded by the handle, has not heretofore been simple and reliable, especially while the blow-molding form is still closed or while it is just opening. This, however, is highly desirable.

SUMMARY OF THE INVENTION

It is, accordingly, an object of the present invention to overcome the disadvantages of the prior art.

More particularly, it is an object of the present invention to permit the removal of flashing on a handle on the type of container described above, that is flashing which is located within the area surrounding the handle and upon whose removal the handle will be provided with an opening for engagement by the fingers or hands of the user.

Still more particularly, it is an object of the present invention to provide an improved apparatus for making blow-molded containers having handles, wherein the removal of such flashing is carried out before the mold is opened.

Another object of the invention is to provide such an apparatus in which the flashing is not only removed but is ejected as the mold is opened.

In keeping with these objects, and other which will become apparent hereafter, one feature of the invention resides in an apparatus for making blow-molded containers having handles. In particular, the invention comprises a combination of mold means including two mold sections for making a blow-molded synthetic plastic container, and handle-forming means. This handle-forming means comprises a rigid first surface on one of the mold sections and having the outline of a generally annular handle to be formed, and an opening corresponding to the center opening of the handle. A first component is mounted on the other of the mold sections for guided movement toward and away from the first surface and has a second surface cooperating with the same for forming the handle therewith and for forming a web-shaped severed flashing where the center opening of the handle is to be. A second component has a third surface corresponding to the opening in the first surface and is movable relative to the latter and to the second surface for withdrawing the severed flashing from the handle.

The parison of which the container is made may be tubular, strip-shaped or the like, as long as it can be blow molded. The second component with the third surface engages and withdraws the severed flashing, shifting the same in parallelism with itself and pushing it into a guide passage in which the first component is slidably accommodated. The first component is spring-biased, or is biased in another manner so as to elastically resist as the second component pushes the severed flashing into the guide opening of the first component.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
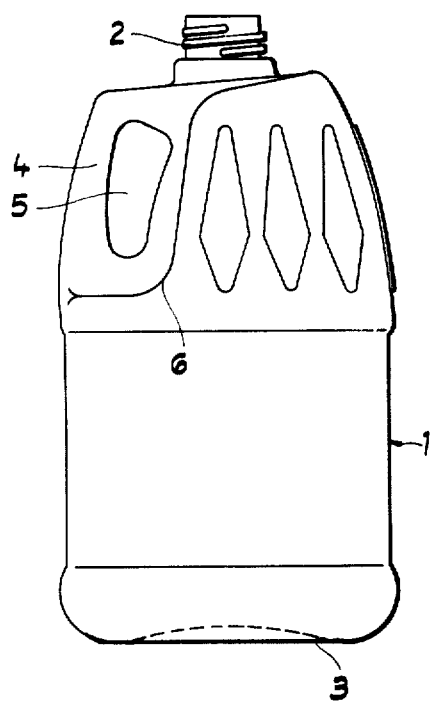
FIG. 1 is a side-elevational view illustrating a blow-molded container having a handle of the type with which the present invention is concerned.

Discussing firstly FIG. 1 it will be seen that reference numeral 1 identifies a hollow container, here shown as a bottle, which is produced of synthetic plastic material by blow-molding. It has a neck 2 for filling and removal of the contents, and a bottom wall 3. The container 1 is provided with a handle 4 having an opening 5 which is produced by squeezing portions of the parison as the mold is closed, to thereby form a hollow handle, that is a handle which is also blow molded at the same time as the container is blow molded and which is of generally annular configuration surrounding the opening 5. Reference numeral 6 designates the line at which the handle 4 merges with the actual body of the container 1.

Figure 2:
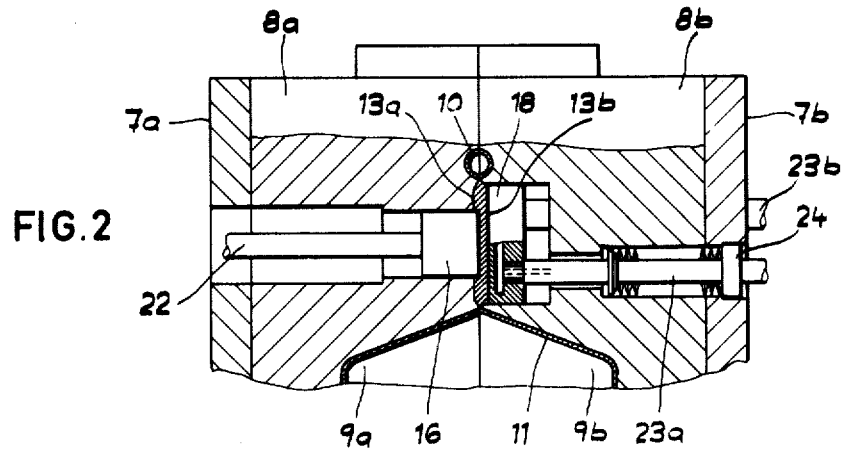
FIG. 2 is a vertical fragmentary section through an upper portion of a blow mold provided with the features according to one embodiment of the invention, and showing the mold in closed condition and squeezing a portion of the parison to form the handle.
Figure 3:
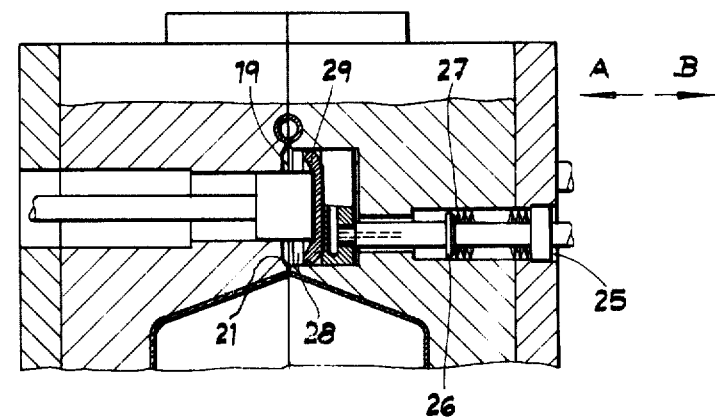
FIG. 3 is a view similar to FIG. 3, showing the mold during opening thereof.
Figure 4:
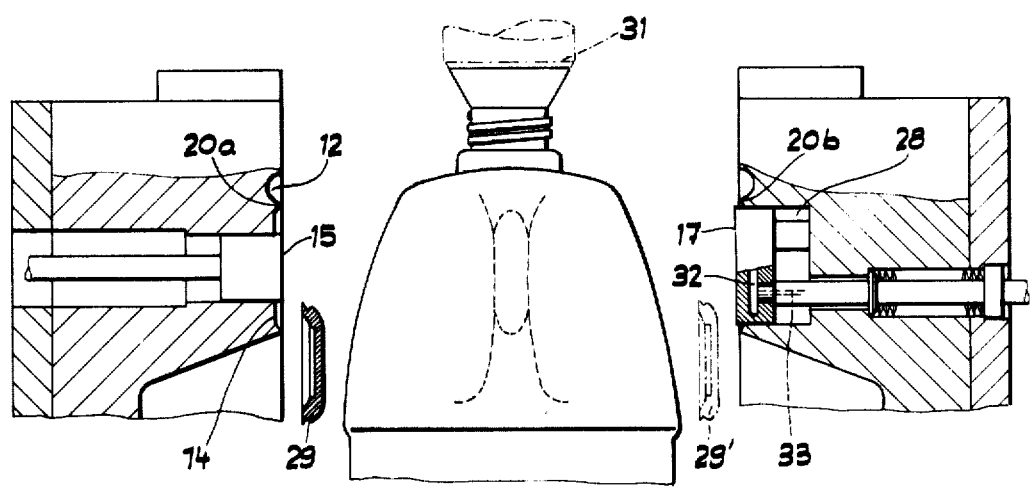
FIG. 4 is a view similar to FIGS. 2 and 3 but showing the mold in open condition in the container-removal stage.

How the flashing is removed from what is subsequently to become the opening 5 surrounded by the handle 4 is illustrated in FIGS. 2–4. No attempt has been made to show the entire blow-molding apparatus because such apparatus is well known. Also, no attempt has been made to show the complete mold for the blow-molding operation because such molds are also known. FIGS. 2–4 show only those components which are in accordance with the present invention. It will be seen that reference numerals 7a and 7b identify plate-shaped elements which are engaged by the non-illustrated closure mechanism of the blow-molding machine, to thereby open and close the mold. The elements 7a and 7b removably carry the mold components, here illustrated in form of the two mold sections 8a and 8b. The sections 8a and 8b are provided with mold recesses 9a and 9b, respectively, which in closed condition of the mold (see FIG. 2) define a mold cavity having the contour to which the parison is to be expanded. In the region where a portion of the parison is to be squeezed to form the hollow part which is to become a handle 10 of a main body portion 11 of the container, a partial mold cavity 12 (see FIG. 4) is provided. Outside of this cavity, in which the handle 10 is being formed, the mold sections 8a and 8b are provided with recesses 13a and 13b, respectively. In the case of the mold section 8a the recess 13a is defined by a face 14 and a front edge 15 of a ram 16; in the mold section 8b the recess 13b is defined by an end face 17 of a counter ram 18. The thus delimited space 19 is surrounded by cutting edges 20a, 20b on the mold sections, thereby creating an edge web 21 of a triangular configuration for the flashing 29 which is located in the opening 5 of the handle, and which has been produced by sqeezing-together the material of the parison in the area where this opening 5 is to be produced.

As a comparison of FIGS. 2–4 would indicate, the ram 16 in the section 8a is connected with a piston rod 22 of a motor, which may be a hydraulic motor, a pneumatic motor, a mechanical or electrically operated motor. The ram 18 is elastically yieldably journalled and is connected, depending upon its size, with at least one and advantageously two or more spring units 23a, 23b which are axially slidably accommodated in sleeves 24 which are threaded into bores 25 of the plate 7b. A spring package, for instance a package 27 of dished springs, is located between the sleeve 24 and an abutment 26 which is rigid with the spring unit 23a, being under tension. Thus, the ram can shift in the direction of the arrow A-B, for which purpose it is accommodated in a guide 28 provided in the mold section 8b.

It will be seen, as shown in FIG. 2, that the flashing 29 will thus be squeezed between a rigid and an elastically yieldable face or surface, with the rigid face or surface being configurated by the face 14 surrounding the space 19 in the mold section 8a, as well as the end face 15 of the ram 16 which forms a partial portion of the surface 14, whereas the elastically yieldable face is configurated by the end face 17 of the ram 18. The ram 16 can extend, as shown in FIG. 2, to some extent into the recess 13a so that, when the mold sections 8a and 8b are moved to the closed position shown in FIG. 2, the outer or foremost portion of ram 16 will push into the flashing 29. However, that portion of the surface 14 which is constituted by the end face 15 of the ram 16 is rigid only during the squeezing phase shown in FIG. 2, whereas during the opening phase shown in FIG. 3 the end face 15 of the ram 16 can move in the direction towards the ram 18, that is in the direction of the arrow B, due to the fact that the ram 16 can so move. This therefore makes it possible to separate the flashing 29 in the opening 5 from the thin remaining webs 21 connecting it with the handle during the opening phase of the mold, while maintaining a counter pressure between the rams 16 and 18. This separation is effected not only by a translatory movement along the axes of the rams 16 and 18, but also by a radial movement which is directed inwardly from all sides and is superimposed upon the translatory movement. This radial movement is the result of the fact that the flashing 29 is pushed into the guide 28 of the ram 18 which recedes as and to the extent that the ram 16 advances. It will be noted that the overall dimension of the ram 18 is less than that of the space 19 and of the boundary 21.

It is therefore clear that the flashing 29 is displaced in the direction of the arrow B, squeezed between the rams 16 and 18, out of the space 19, being at the same time withdrawn from the boundary web 21 in the direction of the arrow C-D. This is possible because the end face 15 of the ram 16 is smaller than the end face 17 of the ram 18, so that the portion 29 has sufficient room outside the area of contact with the ram 16 to bend along its circumference as shown in FIG. 3, thus being able to become withdrawn from the boundary web 21 and enter into the guide passage 28 which is smaller in its outer contour than the circumference of the boundary web 21. The center portion of the portion 29, however, is engaged between the surfaces 15 and 17 and therefore must necessarily become displaced in parallelism with itself, thus assuring a reliable separation from the surrounding handle all along the bounds of the opening 5. Also, tilting about a possible web connecting the portion 29 with the handle, for instance in form of the edge 30a or 30 b as shown in FIG. 5, is thus made impossible.

When the mold has been opened as shown in FIG. 4, the container 1 is maintained in its position by the mandrel 31 which is shown in broken lines, whereas the ram 16 immediately retracts towards the starting position. The portion 29 will normally adhere to the ram 16 which usually will have become partly impressed into it, and due to its above-described reduction in its outer contour the portion 29 can be withdrawn by the ram 16 through the opening 5 of the handle. When the ram 16 reaches its starting position, the flashing or portion 29 is stripped off by contact with the wall of the recess 13a and can fall under the influence of gravity downwardly out of the mold. In the event that the flashing 29 should remain engaged in the guide recess 28, it will be expelled by the ram 18, as indicated at 29', because the ram is automatically returned to its starting position by the springs 27.

Reference numeral 32 designates a cooling channel which is connected with a cooling circuit (not shown) via the inlet and outlet channels 33. This permits an intensive cooling which is entirely separate from the cooling circuit used for cooling the remainder of the mold and thus the remainder of the blow-molded container, and which makes possible a rapid setting of the material of the flashing 29 which, by contrast to the thin-walled container 11 and the handle 10, is relatively thick. Such rapid setting can aid significantly in assuring that the apparatus is capable of acting upon the flashing 29 in the manner described above. It will be appreciated that the ram 16 can also be intensively cooled, if and when desired, although it is clear that it is simpler to cool the ram 18 which not only has a larger surface area but which is also not connected with a motor for advancing and retracting it.

Figure 5:
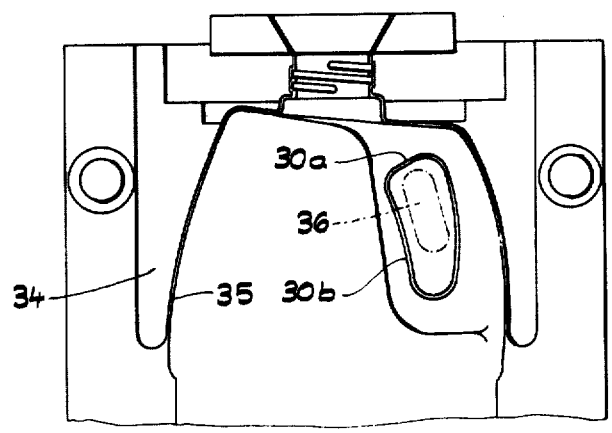
FIG. 5 is a side view of the upper portion of a mold in open condition, with blow-molded container.

Coming, finally, to FIG. 5 it will be seen that reference numeral 34 designates the squeezed-together portions of the tubular parison which are located outside the contour of the expanded body. Reference numerals 35, 30a, 30b designate the edges in which the material is severed by squeezing along the juncture of the body of the container to the squeezed portions, and reference numeral 36 designates in broken lines the contour of the ram 16 which is used in making a container such as that illustrated in FIG. 1.

It will be understood that each of the elements described above, or two or more together, may also find a useful application in other types of constructions differing from the type described above.

While the invention has been illustrated and described as embodied in an apparatus for blow-molding of containers having handles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. In an apparatus for making blow-molded containers having handles, a combination comprising mold means including two mold sections for making a blow-molded synthetic plastic container; and handle-forming means comprising a rigid first surface in one of said mold sections and having the outline corresponding to the center opening of a generally annular handle to be formed, a first component in the other of said mold sections for resilient guided movement toward and away from said first surface and having a second surface of predetermined dimension, said first and said second surface being surrounded by cutting means cooperating with each other for forming a web-shaped severed flashing in the center opening of the handle to be formed, and a second component within the outline of said first surface having a third surface of a dimension smaller than said second surface and movable relative to said first and to said second surface for squeezing bending and thereby withdrawing the severed flashing from the handle; said first and said third surface together defining a first recess in said one of said mold sections while said second surface bounds a second recess in said other of said mold sections, said recesses delimiting a space surrounded by said cutting means for the flashing of the opening to be produced.

2. A combination as defined in claim 1, wherein at least said first component is spring-biased toward said first surface.

3. A combination as defined in claim 1, further comprising a guide for said first component; and wherein said second component is operative for pushing said flashing into said guide.

4. A combination as defined in claim 1, said first and second components each being slidable rams; and further comprising biasing means biasing said first component towards said first surface.

5. A combination as defined in claim 4, said biasing means comprising a passage in said other mold section, spring means in said passage, and abutment means in said passage and on said first component for said spring means to bear upon.

6. A combination as defined in claim 4, said mold sections having facing surfaces adapted to abut one another and each provided with a recess for the respective ram.

7. A combination as defined in claim 6, wherein said second and third surfaces extend outwardly beyond the respective recesses when said facing surfaces are out of abutment with one another.

8. A combination as defined in claim 4, and further comprising cooling means for cooling said mold sections.

9. A combination as defined in claim 8, further comprising cooling means for cooling at least one of said rams.

10. A combination as defined in claim 9, wherein said cooling means for said ram is separate from the cooling means for said mold sections.

* * * * *